United States Patent [19]
Yamazaki et al.

[11] Patent Number: 6,160,682
[45] Date of Patent: Dec. 12, 2000

[54] MAGNETIC HEAD DEVICE WITH RAIL FORMED WITHIN WIDTH OF HEAD CHIP AND METHOD OF MAKING SAME

[75] Inventors: Masahiko Yamazaki; Kiyoshi Hasegawa, both of Miyagi, Japan

[73] Assignee: Sony Corporation, Tokyo, Japan

[21] Appl. No.: 09/190,463

[22] Filed: Nov. 13, 1998

[30] Foreign Application Priority Data

Nov. 14, 1997 [JP] Japan .................................. 9-314080

[51] Int. Cl.[7] .................................................. G11B 5/187
[52] U.S. Cl. .................................... 360/234.7; 360/235.4
[58] Field of Search .................................. 360/103, 121, 360/122, 234.7, 235.4

[56] References Cited

U.S. PATENT DOCUMENTS

| 5,831,799 | 11/1998 | Kudo et al. | 360/122 |
| 5,907,457 | 5/1999 | Kudo et al. | 360/103 |

OTHER PUBLICATIONS

Patent Abstracts of Japan, vol. 097, No. 007, Jul. 31, 1997 & JP 09 069204 A (Mitsumi Electric Co. Ltd.) Mar. 11, 1997.
Patent Abstracts of Japan, vol, 012, No. 363 (P–764), Sep. 29, 1988 & JP 63 113921 A (Alps Electric Co., Ltd.), May 18, 1988.
Patent Abstracts of Japan, vol. 097, No. 012, Dec. 25, 1997 & JP 09 212818 A (Mitsumi Electric Co. Ltd.) Aug. 15, 1997.

*Primary Examiner*—Jefferson Evans
*Attorney, Agent, or Firm*—Sonnenschein, Nath & Rosenthal

[57] ABSTRACT

A magnetic head device exhibiting optimum floating characteristics without the risk of fracturing a first rail, and a manufacturing method for the magnetic head device. In this magnetic head device, the first rail is formed on a surface of a first head chip facing a disc-shaped recording medium for extending parallel to the running direction of the disc-shaped recording medium, and a second rail is formed for extending parallel to the first rail. The first rail is formed by grooving the center slider side of the first head chip.

7 Claims, 6 Drawing Sheets

MAGNETIC HEAD DEVICE WITH RAIL FORMED WITHIN WIDTH OF HEAD CHIP AND METHOD OF MAKING SAME

BACKGROUND OF THE INVENTION

1. Field of the Invention

This invention relates to a magnetic head device for recording and/or reproducing data on a signal recording surface of a disc-shaped recording medium and a method for producing the magnetic head device.

2. Description of the Related Art

Disc drive devices on recording/reproducing data for a signal recording surface of a disc-shaped recording medium, such as a flexible disc, have been widely used in office computers and word processors, to say nothing of personal computers.

One such disc drive device has a magnetic head device with which to recording and/or reproducing data. This magnetic bead device carries a head chip on the distal end of each of two supporting arms so that the head chips face each other. The disc-shaped recording medium is sandwiched between the head chips for recording/reproducing data on oppositely facing signal recording surfaces.

The recent tendency in the disc-shaped recording medium is high density recording. In keeping up with this trend, the disc drive device for recording/reproducing the disc-shaped recording medium has also been improved correspondingly. That has been, the disc drive device is improved so as to have a driving system for rotationally driving the disc-shaped recording medium more speedily or a magnetic head device capable of forming recording tracks at a finer track pitch.

Specifically, the flexible disc, now in use, is recorded/reproduced as the magnetic head device is run in rotation in sliding contact with the signal recording surface of the disc. According to a recent proposal, the flexible disc in current use is recorded/reproduced with a high recording density of tens to hundreds of Mbytes. For recording/reproducing the flexible disc with this high recording density, a magnetic head device is used in which the flexible disc is run in rotation at a high speed and in which a head portion is slightly floated from the signal recording surface.

For recording/reproduction at different recording densities, different magnetic head devices are required. However, use of plural disc drive devices is laborious and expensive. It has thus been proposed to use a disc drive device capable of recording/reproduction with two sorts of the recording densities, namely a disc drive device having lower order compatibility.

The disc drive device exhibiting this lower order compatibility has a low order mode magnetic head for recording/reproduction adapted for having a sliding contact with the flexible disc and an upper order magnetic head for recording/reproduction adapted for being floated from the flexible disc.

With this magnetic head device, the flexible disc facing surface of the magnetic head device has two rails extending parallel to the disc running direction in order to cause the head portion to be floated slightly from the signal recording surface of the flexible disc for recording/reproduction in the upper order mode. By running the flexible disc at an elevated speed, there is generated a so-called air film between an area delimited between these two rails and the flexible disc surface to cause the head to be floated slightly.

In this magnetic head device, the width of these two rails or the separation therebetween affects the floating characteristics of the magnetic head device significantly. In this magnetic head device, the two rails formed on the flexible disc facing surface need to be formed to an extremely narrow tolerance.

In the above-described magnetic head device, the two rails are formed by bonding plural components, such as a head chip having a magnetic head for the upper mode or a head chip having a magnetic head for the lower mode, to form a chip assembly, and by grinding a flexible disc facing surface of the chip assembly to produce the above-mentioned two rails. The magnetic head of the upper mode faces one of the rails, with the magnetic head of the lower mode facing the other rail.

However, since the chip assembly is ground for forming these two rails, the boundary portion between the two chips tends to be cut off. In particular, if the junction surface is exposed on the two rails, the exposed portion tends to be fractured.

If the rail is partially fractured in this manner, the flexible disc tends to be damaged by resulting fractured pieces. Moreover, if the rails are fractured partially, the rail width cannot be set to a defined magnitude, thus affecting floating characteristics of the magnetic head device.

SUMMARY OF THE INVENTION

It is therefore an object of the present invention to provide a magnetic head device having optimum floating characteristics without the risk of fracturing the first rail, and a method for manufacturing the magnetic head device.

In one aspect, the present invention provides a magnetic head device including a first head chip having a first magnetic gap for recording and/or reproducing a disc-shaped recording medium with a first recording density, a second head chip having a second magnetic gap for recording and/or reproducing the disc-shaped recording medium with a second recording density higher than the first recording density, and a center slider arranged between and bonded to the first and second head chips. The surface of the first head chip facing the disc-shaped recording medium carries a first rail extending parallel to the running direction of the disc-shaped recording medium, with a second rail being formed for extending parallel to the first rail. The first rail is formed by a groove formed in a portion of the first head chip towards the center slider.

With the present magnetic head device, the first rail is designed to be larger in width than the first head chip for grooving the first head chip. Also, with the present magnetic head device, the center slider is not exposed on the first rail. Thus, the first rail is less susceptible to fracture and has a preset width. Therefore, with the present magnetic head device, there is no risk of the fracture of the first rail and hence of the disc-shaped recording medium, while the magnetic head device exhibits optimum floating characteristics by the first rail.

More specifically, with the magnetic head device of the present invention, the first head chip is larger in width than the first rail and the first head chip is exposed to the lateral side parallel to the longitudinal direction of the first rail. That is, with the present magnetic head device, the first rail is not faced by the center slider nor by the side slider. Therefore, the first rail is less liable to be fractured to improve reliability of the head device as well as to assure stable floating properties.

In another aspect, the present invention provides a method for producing a magnetic head device comprising the steps of bonding a first head chip and a second magnetic chip to each other via a center slider, grinding both ends along the width of the first head chip and the center slider to form a first rail and grinding both ends along the width of the second head chip and the center slider to form a second rail. The first head chip has a first magnetic gap for recording and/or reproducing a disc-shaped recording medium with a first recording density and the second head chip has a second magnetic gap for recording and/or reproducing the disc-shaped recording medium with a second recording density higher than the first recording density.

With the present manufacturing method of the magnetic head device according to the present invention, both ends of the first head chip along the width thereof are ground, such that only the first head chip is exposed to the first rail without the center slider being exposed to the first rail. Thus, with the present technique, the first rail is less susceptible to fractures to realize a magnetic head device having optimum floating characteristics.

More specifically, with the present manufacturing method, both ends along the width of the first head chip, center slider and the side slider are ground to form the first rail. Therefore, with the present technique, the first rail is not faced by the center slider nor by the side slider. Thus, with the present technique, the first rail is not liable to be fractured to enable manufacture of a magnetic head device having improved reliability. Also, with the present technique, a magnetic head device having stable floating characteristics can be produced reliably.

DESCRIPTION OF THE PREFERRED EMBODIMENTS

Figure 1:
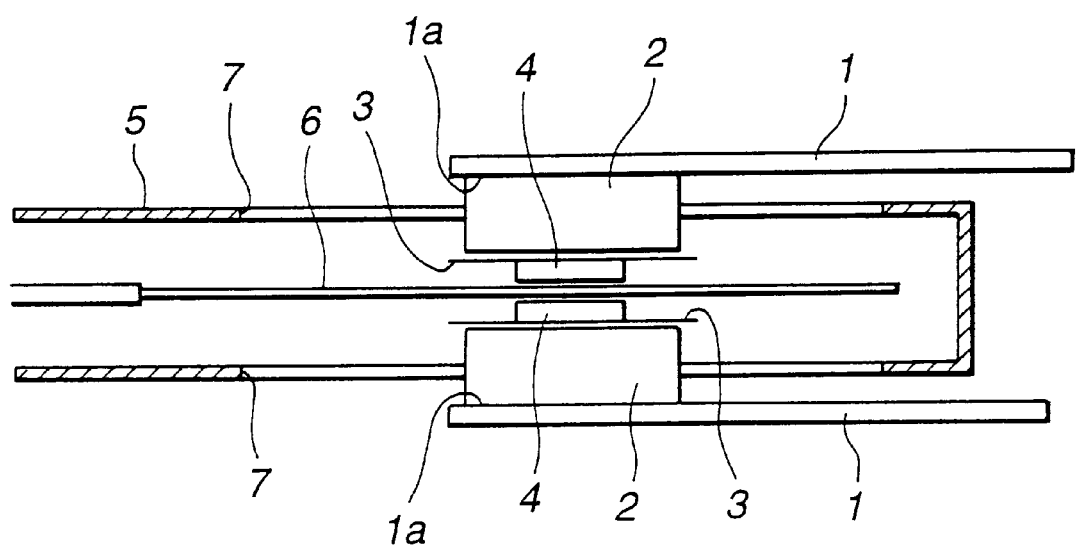
FIG. 1 is a schematic partial cross-sectional view showing an arrangement of recording/reproducing a disc-shaped recording medium by a magnetic head device according to the present invention.

Referring to the drawings, a preferred embodiment of the present invention will be explained in detail. This embodiment is directed to a magnetic head device for recording and/or reproducing data for a signal recording surface of a disc-shaped recording medium such as a flexible disc.

The magnetic head device of the present embodiment includes a pair of supporting arms 1, a spacer member 2 set on a distal end 1a of each supporting arm 1, a gimbal 3 arranged on each spacer member 2 and a head unit 4 mounted on each gimbal 3, as shown in FIG. 1. In the present magnetic head device, the paired supporting arms 1 are arranged so that the paired head units 4 face each other.

The magnetic head device records/reproduces a flexible disc 6 housed rotatably in a cartridge 5 provided with an opening 7 sized sufficiently to permit entrance of the magnetic head device therein. Thus, if the flexible disc 6 is to be recorded/reproduced using this magnetic head device, the paired head units 4 are intruded via the aperture 7 so that the flexible disc 6 is sandwiched between its paired heads 4.

Figure 2:
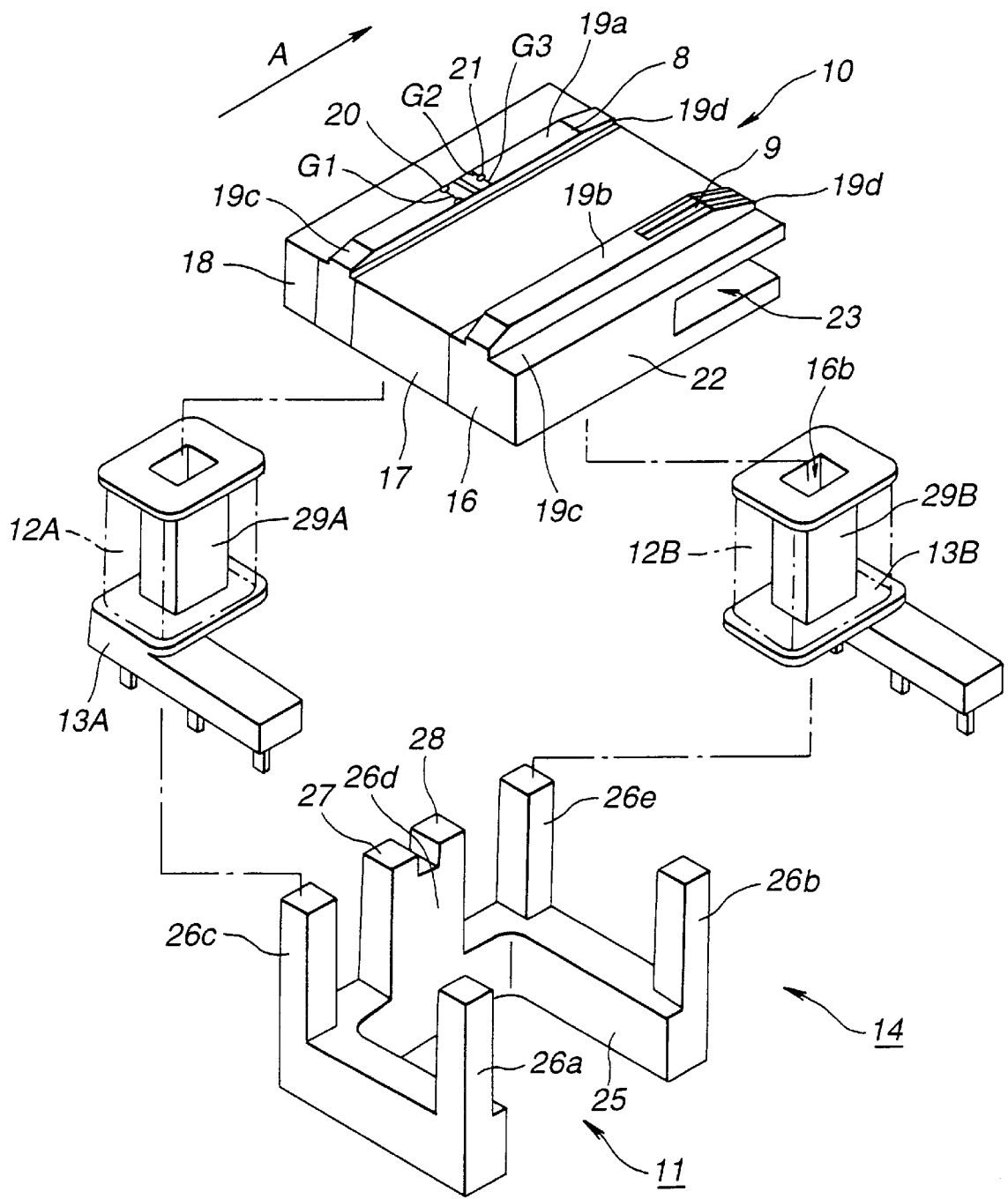
FIG. 2 is an exploded perspective view showing a head portion of the magnetic head device.

In this magnetic head device, the head unit 4 includes head chip unit 10 having a first head chip 8 for recording/reproducing data at a first recording density and a second head chip 9 for recording/reproducing data at a second recording density higher than a first recording density in a state in which the second head chip 9 is floated above the signal recording surface of the flexible disc 6, as shown in FIG. 2. The head unit 4 also includes a core unit 14 on the surface of the head chip unit 10 opposite to the flexible disc 6. The core unit 14 includes a core forming member 11 and first and second coil units 13A, 13B mounted on the core forming member 11 for encircling coils 12A and 12B, respectively.

Figure 3:
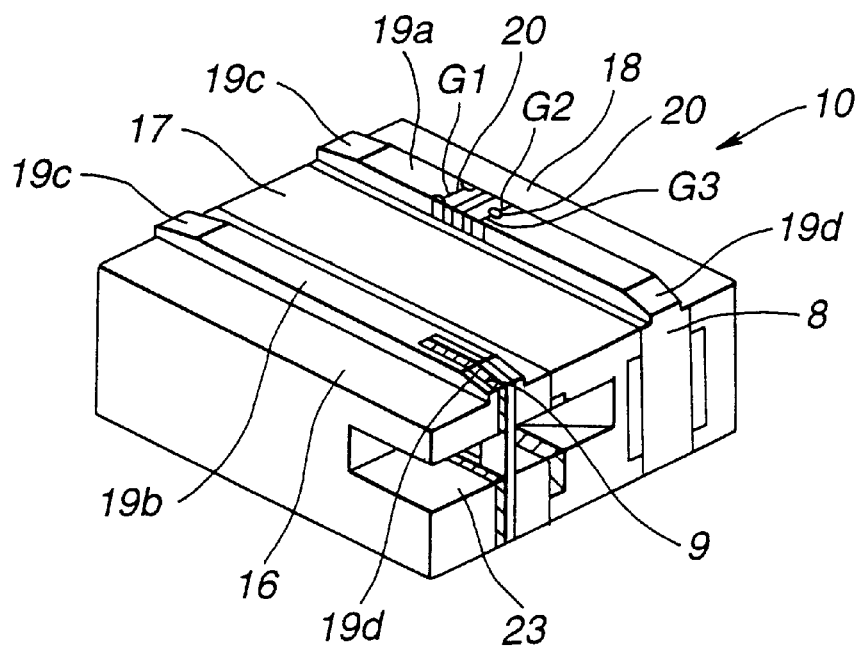
FIG. 3 is a perspective view showing a head chip portion in the magnetic head device.

Referring to FIG. 3, the head chip unit 10 includes an upper order head slider 16 having the second head chip 9 assembled therein, a center slider 17 arranged between the upper order head slider 16 and the first head chip 8 and a side slider 18 arranged for sandwiching the first head chip 8 in cooperation with the center slider 17. That is, the head chip unit 10 is completed by the upper order head slider 16, center slider 17, first head chip 8 and the side slider 18 bonded together in this order.

Also, the surface of this head chip unit 10 facing the flexible disc 6 has rails 19a, 19b extending along the direction of sliding movement A of the recording medium. These rails 19a, 19b are formed for floating the head unit 4 from the flexible disc 6 rotating at an elevated speed. Referring to FIG. 2, a front taper 19c and a rear taper 19d are formed on the entrance side and on the exit side of the flexible disc 6, respectively. The front taper 19c is formed at an angle of approximately 0.5° relative to the surface of the flexible disc 6, while the rear taper 19d is formed at an angle of approximately 10° relative to the flexible disc surface.

In this magnetic head device, the rail 19a is formed by grinding the first head chip 8, as will be explained subsequently. The first head chip 8 includes a magnetic head for writing and reproduction (read/write head) 20, at a mid portion in the longitudinal direction of the first head chip 8, and an erasure magnetic head (erasure head) 21 arranged downstream of the read/write head 20 in the medium sliding direction A. This read/write head 20 has a magnetic gap G1 lightly larger than the track width of the recording track. The erasure head 21 is arranged downstream of the magnetic gap G1 of the read/write head 20 and includes magnetic gaps G2, G3 on both ends along the width of the magnetic gap G1.

With this first head chip 8, the flexible disc 6 is recorded by the magnetic gap G1 of the read/write head 20. The erasure head 21 erases preset amounts of both end portions in the width-wise direction of the recording track written by the magnetic gaps G2, G3 to control the track width of the recording track formed on the flexible disc 6 to a preset magnitude. That is, the present magnetic head device includes a so-called tunnel erasure head comprised of the read/write head 20 and the erasure head 21.

The first head chip 8 preferably has a width larger than the width of the rail 19a and in particular a width larger by not less than 25 µm than the width of the rail 19a. Thus, the first head chip 8 has a substantially convex-shaped cross-section.

On the other hand, the rail 19b is formed by grinding the second head chip 9 as will be explained subsequently. This second head chip 9 has a magnetic gap capable of forming a recording track narrower in width than that with the above-mentioned read/write head 20 and has a so-called MIG head assembled therein. The upper order head slider 16 is formed by burying the second head chip 9 in the slider 22 formed of e.g., ceramics.

This slider 22 has a cut-out 23 for exposing part of the second head chip 9 to the outside. The portion of the second head chip 9 which serves as the magnetic core is partially exposed to the outside in this cut-out. On this exposed portion is wound a coil for the second coil chip, not shown in FIG. 3.

Figure 4:
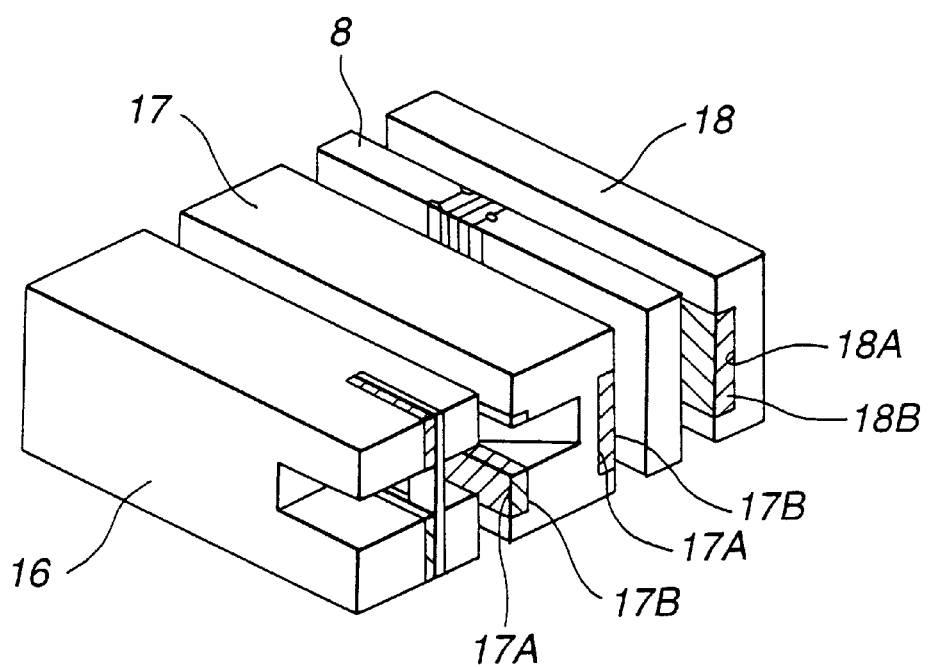
FIG. 4 is an exploded perspective view showing an assembly process of the head chip portion in the manufacturing method for the magnetic head device according to the present invention.
Figure 5:
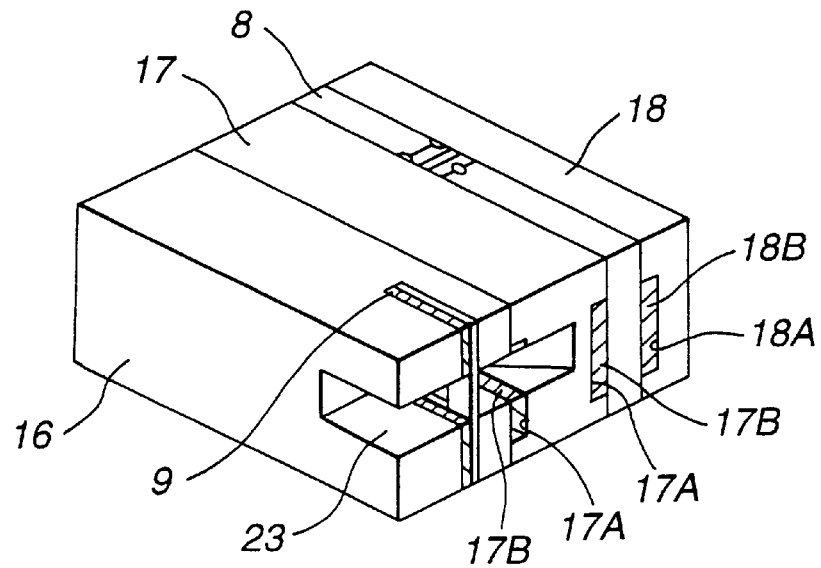
FIG. 5 is perspective view showing the bonded state of an upper order head slider, a center slider, a first head chip and a side slider.

In preparing the head chip unit 10, the upper order head slider 16, center slider 17, first head chip 8 and the side slider 18 are bonded together by glass fusion, as shown in FIG. 4. In both lateral surfaces of the center slider 17 are formed recesses 17A for extending along the length of the center slider 17, and fused glass 17B is charged into each of the recesses 17A. This fuses the center slider 17 to the upper order head slider 16 and to the first head chip 8. In a lateral surface of the side slider 18 facing the first head chip 8 is also formed a recess 18A in which is charged fused glass 18B. This fuses the side slider 18 to the first head chip 8. Thus, the head chip unit 10 is formed to a substantially parallelepipedic shape, as shown in FIG. 5.

Figure 6:
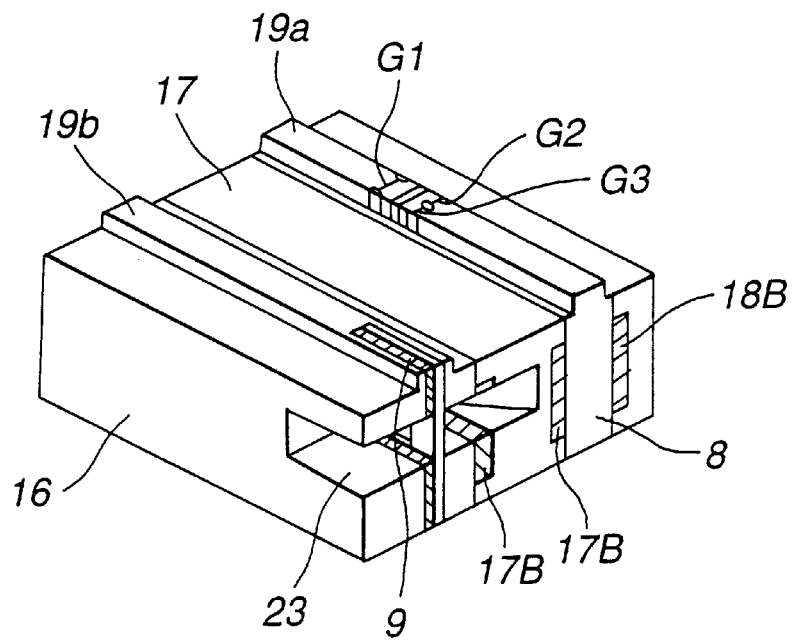
FIG. 6 is a perspective view of a head chip portion for illustrating the ground state.
Figure 7:
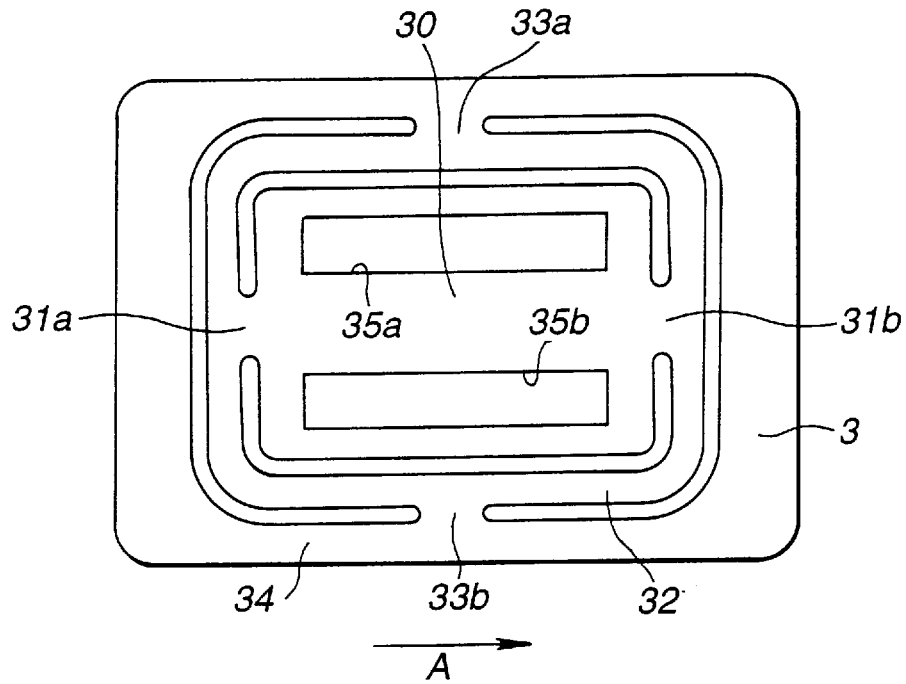
FIG. 7 is a plan view of a gimbal in the magnetic head device.

The head chip, thus formed by bonding, is ground, as shown in FIG. 6. This grinding is performed in a direction parallel to the longitudinal direction of each component part in order to form the rails 19a, 19b. Since the rails 19a, 19b prescribe the floating characteristics of the head unit 4, the widths of and the separation between these rails are prescribed accurately. Thus, the rails 19a, 19b are formed to preset widths and separation without dependency upon the widths of the respective components.

With the magnetic head device, the first head chip 8 is formed so as to have a width larger than the width of the rail 19a. For this reason, when forming the rail 19a of a preset width, the vicinity of both ends along the width of the first head chip 8 is ground simultaneously. By forming the rail 19a in this manner, the first head chip 8 presents a substantially convexed cross-section.

Since the rail 19b is formed by grinding the upper order head slider 16, the second head chip 9 faces the upper side of the rail 19b.

The core forming member 11 mounted on the above-described head chip unit 10 includes a substantially U-shaped base block 25, formed of a magnetic material, legs 26a, 26b of a non-magnetic material, set upright on the top of the base block 25 and legs 26c, 26d and 26e of a magnetic material, set upright on the top of the base block 25, as shown in FIG. 2. That is, the legs 26a, 26b are set upright on the ends of the base block 25, while the legs 26c, 26e are set upright on the corners of the base block 25 and the leg 26d is set upright between the legs 26c and 26e. The upper end face of the leg 26d towards the head chip unit 10 has a recess whereby the upper surface presents a first end face 27 and a second end face 28.

The first coil unit 13A, mounted on the core forming member 11, includes a coil 12A and a first bobbin 29A wound about the coil 12A. This first bobbin 29A is L-shaped and has a tubular portion. This first bobbin 29A has the inner peripheral surface of the tubular portion thereof substantially of the same shape as the outer peripheral surface of the leg 26c. A terminal portion is formed at right angle to the lower end of the tubular portion.

Similarly to the first coil unit 13A, the second coil unit 13B has a coil 12B and a second bobbin 29B encircling the coil 12B. This second bobbin 29B is L-shaped and has a tubular portion. This second bobbin 29B is designed so that the inner peripheral surface of the tubular portion thereof is substantially of the same shape as the outer peripheral surface of the leg 26e. A terminal portion is formed at right angle to the lower end of the tubular portion.

The first coil unit 13A and the second coil unit 13B are mounted at the respective tubular portions thereof on the legs 26c, 26e, respectively, with the coils 12A, 12B encircled around the first and second bobbins 29A, 29B, respectively.

The core unit 14 is abutted against the head chip unit 10, with the first coil unit 13A and the second coil unit 13B mounted in position on the core forming member 11, as described above. At this time, the legs 26a, 26b are abutted against both corners of the head chip unit 10 towards the upper order head slider 16. The leg 26c has its upper surface abutted. against the erasure head 21 for magnetic coupling therewith. The leg 26e has its upper surface abutted against the erasure head 21 for magnetic coupling therewith. The leg 26d is positioned between the read/write head 20 and the erasure head 21 so that its first end face 27 and its second end face 28 are abutted against the read/write head 20 and the erasure head 21, for magnetic coupling therewith, respectively.

By the core unit 14 thus abutting against the head chip unit 10, the legs 26c, 26d make up a magnetic core of the read/write head 20. Specifically, with the read/write head 20, a magnetic path is formed between the leg 26c carrying the first coil unit 13A and the leg 26d abutted against the first end face 27. By the core unit 14 and the head chip unit 10 abutted to each other, the legs 26e, 26d make up a magnetic core in the erasure head 21. That is, in the erasure head 21, a magnetic path is formed between the leg 26e carrying the second coil unit 13B and the leg 26d abutted against the first end face 27.

The gimbal 3, mounted on the head unit 4, has the shape of a substantially rectangular plate, in its entirety, and includes a head mounting unit 30, for setting the head chip unit 10 thereon, a first annular frame unit 32, connected to the head mounting unit 30 via first connecting portions 31a, 31b for encircling the outer rim of the head mounting unit 30 and a second annular frame unit 34 connected to the first annular frame unit 32 via second connecting portions 33a, 33b for encircling the first annular frame unit 32. The gimbal 3 is designed so that the direction interconnecting the first connecting portions 31a, 31b is perpendicular to the direction interconnecting the second connecting portions 33a, 33b. The direction interconnecting the first connecting portions 31a, 31b is parallel to the medium sliding direction A. The gimbal 3 is formed of, for example, stainless steel.

In this gimbal, the head mounting unit 30 is designed so as to have an outer shape slightly larger than that of the head chip unit 10. The head mounting unit 30 also has a pair of apertures 35a, 35b spaced apart from each other in a direction perpendicular to the medium sliding direction A.

The gimbal 3, constructed as described above, is mounted on the head unit 4. Specifically, the gimbal 3 is mounted between the head chip unit 10 and the core unit 14. It is noted that the head chip unit 10 is set on one surface of the gimbal 3 so that both corners thereof towards the upper order head slider 16 face the aperture 35a and so that the first head chip 8 faces the aperture 35b. The legs 26a, 26b are abutted against the portions of the head chip unit 10 facing the aperture 35a from the opposite side surface of the gimbal 3. The legs 26c, 26d and 26e are abutted as described above against the portions of the head chip unit 10 facing the aperture 35b.

Thus, the aperture 35a is sized to be large enough to permit intrusion of the legs 26a or 26b, while the aperture 35b is sized to be large enough to permit intrusion of the legs 26c, 26d and 26e.

Thus, the gimbal 3 is mounted at a mid portion along the height of the head unit 4.

Figure 8:
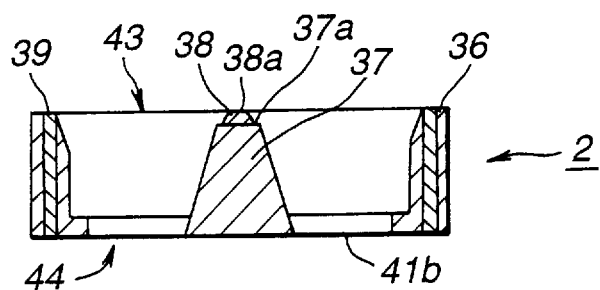
FIG. 8 is a longitudinal cross-sectional view of a spacer member in the magnetic head device.

The spacer member 2, mounting the gimbal 3, is made up of a substantially annular peripheral wall section 36, a pivot setting unit 37, set upright inwardly of the peripheral wall section 36, and a pivot 38 set on the pivot setting unit 37, as shown in FIG. 8.

This peripheral wall section 36 has an inner size slightly larger than the outer size of the core unit 14 and is of substantially the same tubular configuration as the outer shape of the gimbal 3. The peripheral wall section 36 has an internal magnetic shield 39 which is formed of, for example, a magnetic material of high magnetic permeability and has an outer size slightly smaller than the peripheral wall section 36.

This pivot setting unit 37 is set upright at a mid portion on the inner surface of the peripheral wall section 36 and is of a height slightly smaller than the peripheral wall section 36. On an upper end face 37a of the pivot setting unit 37 is formed the pivot 38 which is of a semi-spherical shape and which has its upper end 38a positioned at a level slightly higher than the height of the peripheral wall section 36 when the pivot 38 is set on the pivot setting unit 37.

The spacer member 2 is prepared by integrally molding the peripheral wall section 36, pivot setting unit 37 and the pivot 38. The spacer member 2 is preferably insert-molded for placing a magnetic shield 39 inwardly of the peripheral wall section 36.

Figure 9:
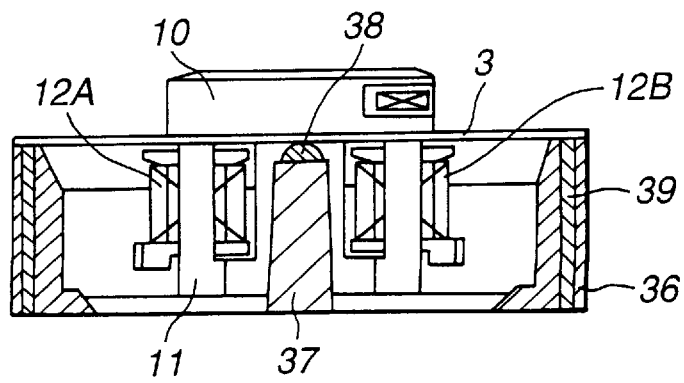
FIG. 9 is a partial cross-sectional view for illustrating the assembled state of the head portion, gimbal and the spacer member.
Figure 10:
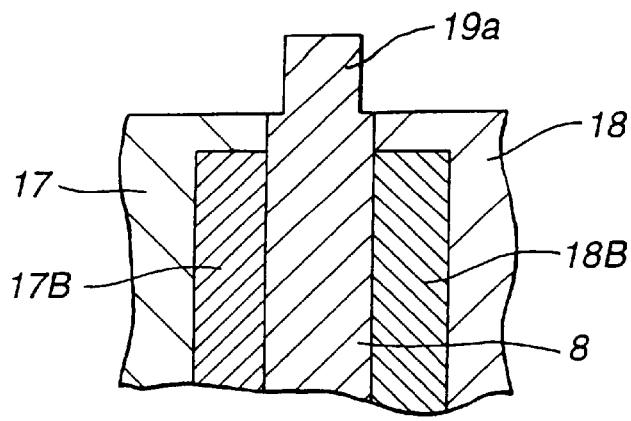
FIG. 10 is a schematic longitudinal cross-sectional view of the head chip portion.
Figure 11:
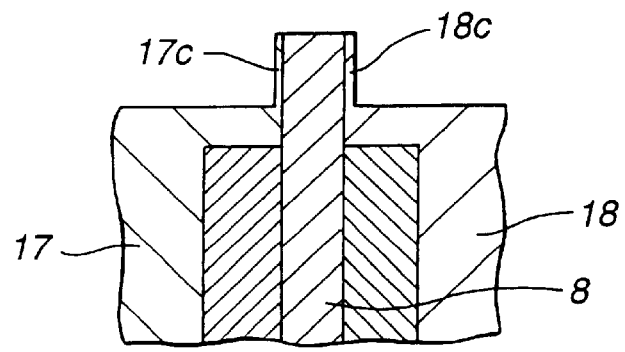
FIG. 11 is a schematic longitudinal cross-sectional view of the head chip portion in the conventional magnetic head device.

The spacer member 2 is mounted fixedly on the gimbal 3, as shown in FIG. 9. Specifically, the spacer member 2 is mounted on the side of the gimbal 3 opposite to its side carrying the head chip unit 10, that is on the opposite surface of the gimbal 3. By mounting the opposite surface of the gimbal 3 on the spacer member 2, the pivot 38 thrusts the mid portion of the opposite surface of the gimbal 3 with a preset pressure. That is, the head mounting unit 30 of the gimbal 3 is carried by the pivot 38 from its opposite side surface.

At this time, the core unit 14, located on the opposite side surface of the gimbal 3, is housed inwardly of the peripheral wall section 36. Meanwhile, since the pivot setting unit 37 is positioned at an opening portion of the substantially U-shaped base block 25, it is not obstructive when housing the core unit 14 inwardly of the peripheral wall section 36.

The paired supporting arms 1, adapted for carrying the spacer member 2, are plate-shaped members of a preset length, as shown in FIG. 1. The one end of each supporting arm 1, not shown, is connected to a magnetic head device driving means, not shown. The other ends of the paired supporting arms 1 carry the spacer members 2. The end faces of the spacer members 2 opposite to the end faces thereof carrying the gimbal 3 are mounted on the opposite ends of the supporting arms 1. On the paired supporting arms 1 are arranged the spacer members 2 for facing each other.

In the present magnetic head device, the height from the supporting arm 1 to the head unit 4 can be adjusted by setting the height of the spacer member 2 to a defined value. That is, with the present magnetic head device, the supporting arm 1 can be kept out of contact with the cartridge 5 when the head unit 4 is at the position of recording/reproducing the flexible disc 6. Stated differently, the spacer member 2 is of a height such that the supporting arm 1 is not contacted with the cartridge 5 during recording/reproduction.

In the above-described magnetic head device according to the present invention, the flexible disc 6 housed in the cartridge 5 is recorded/reproduced. In the present magnetic head device, the recording/reproduction may be performed at the conventional standard recording density (lower order mode) or at the high recording density (upper order mode).

If recording/reproduction is made with the lower order mode, the head unit 4 is contacted with the flexible disc 6 and, in this state, the flexible disc 6 is run in rotation. The flexible disc 6 is run in rotation at a rpm of approximately 300.

With the present magnetic head device, the rotating flexible disc 6 is recorded/reproduced by the first bead chip 8 in this first head chip 8. A magnetic path is formed between the legs 26c, 26d and the read/write head 20 by the magnetic field emanated from the first coil unit 13A mounted n the leg 26c. On the rotating flexible disc 6, a recording track is formed by the read/write head 20. Simultaneously, another magnetic path is formed in the first head chip 8 between the legs 26e, 26d and the erasure head 21 by the magnetic field emanating from the second coil 13B mounted on the leg 26e. This erases only the vicinity of both ends along the track width of the recording track formed by the read/write head 20. Thus, with the present first head chip 8, it is possible to form a recording track having a desired track width.

In the case of the upper order mode recording/reproduction, the head unit 4 is slightly floated from the surface of the flexible disc 6, which is run in rotation in this state. The flexible disc 6 is rotated at this time at an rpm of approximately 3600. If the flexible disc 6 is run in rotation at tis elevated speed, an air stream is produced between the recess formed in the head unit 4 and the flexible disc 6 to produce a so-called air film. Thus, with the present magnetic head device, the head unit 4 can be floated a defined amount during recording/reproduction in the upper order mode. Specifically, the head unit 4 is floated approximately 50 nm from the surface of the flexible disc 6.

For controlling the amount of float of the head unit 4, it suffices if the width and the height of the rails 19a, 19b formed on the medium facing surface of the head unit 4 are prescribed to pre-set magnitudes. Specifically, in order to achieve the amount of float of approximately 50 nm, it suffices if the widths of the rails 19a, 19b, each 3 mm long, are each of a width of 0.3 nm and a height of 0.1 mm.

The present magnetic head device performs recording/reproduction by high density recording by the second head chip 9 for the rotating flexible disc 6. With the second head chip 9, the recording track is formed by, for example, a MIG head by the magnetic field emanating from the coil formed in the upper order head slider 16.

With the present magnetic head device, the first head chip 8 is larger in width than the rail 19a and is exposed on the lateral side parallel to the longitudinal direction of the rail 19a.

Conversely, should the rail 19a be approximately equal in width to the first head chip 8, as in the conventional magnetic head device, a center slider 17C and a side slider 18C are left on the lateral sides parallel to the longitudinal direction of the rail 19a. In this case, the center slider 17C and the side slider 18C face the rail 19a.

Figure 12:
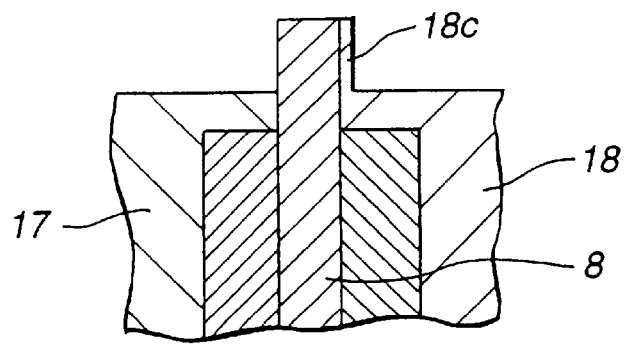
FIG. 12 is a schematic longitudinal cross-sectional view showing the state of a fractured rail in the head chip portion in the conventional magnetic head device.

In this case, the center slider 17C and the side slider 18C on one hand and the first head chip 8 on the other hand are simply abutted against each other without being fused together by fused glass. Also, with the rail 19a, the center slider 17C and the side slider 18C are reduced in thickness significantly by grinding. Therefore, in this case, the center slider 17C and the side slider 18C tend to be fractured in the rail 19a, as shown in FIG. 12.

If the rail 19a is partially fractured in this manner, broken chips tend to damage the flexible disc 6. Conversely, with the magnetic head device of the present invention, since the rail 19a is formed solely by the first head chip 8, there are no mechanically fragile portions and hence there is no risk of fracture. Thus, the present magnetic head device is reliable in that the flexible disc 6 is not liable to be damaged.

The conventional magnetic head device has a drawback that the rail 19a tends to be partially fractured, so that no stable floating characteristics are realized. Conversely, with the magnetic head device of the present invention, there is no risk of fracture of the rail 19a to realize optimum floating characteristics.

What is claimed is:

1. A magnetic head device comprising:
   a first head chip having a first magnetic gap for recording signals on and/or reproducing signals from a disc-shaped recording medium with a first density;
   a second head chip having a second magnetic gap for recording signals on and/or reproducing signals from the disc-shaped recording medium with a second density; and
   a center slider arranged between and bonded to said first and second head chips,
   wherein,
   a surface of the first head chip facing the disc-shaped recording medium carries a first rail extending parallel to a running direction of the disc-shaped recording medium, relative to the first head chip,
   a surface of the second head chip facing the disc-shaped recording medium carries a second rail extending parallel to said first rail,
   said first rail formed by parallel grooves in said first head chip so that said first rail is smaller in width than said overall width of said first head chip,
   said first rail does not include any portion of said center slider, and
   said first and second rails protrude above a remainder of said surface.

2. The magnetic head device according to claim 1 further comprising:
   a side slider bonded to the surface of said first head chip opposite to its surface to which is bonded said center slider.

3. The magnetic head device according to claim 1 wherein said first rail is smaller by not less than 25 μm in width than said first head chip.

4. A method of producing a magnetic head device said method comprising the steps of:
   bonding a first head chip and a second head chip to to opposite sides of a center slider, said first head chip having a first magnetic gap for recording signals on and/or reproducing signals from a disc-shaped recording medium, said second head chip having a second magnetic gap for recording signals on and/or reproducing signals from the disc-shaped recording medium; and
   grinding a surface of said magnetic head device with parallel grooves to form two parallel first and second rails respectively extending along said first and second head chips said first rail having a width less than a width of said first head chip no portion of said center slider forming said first rail or said second rail said first and second rails protruding above a surface defined by a remainder of said magnetic head device.

5. A magnetic head device comprising first and second head chips secured to and carried on opposite sides of a center slider, each head chip having a magnetic gap for transducing signals to and from a recording medium, the first head chip having a first rail on a recording medium facing surface of the magnetic head device, the second head chip having a second rail formed on the recording medium facing surface, the first and second rails extending parallel to one another and along a running direction of the head chips relative to a recording medium, the first and second rails formed by parallel grooves extending along the recording medium facing surface, the first rail being smaller in width than an overall width of the first head chip, no portion of the center slider forming the first rail, and the first and second rails protruding from a surface defined by a remainder of said magnetic head device.

6. The magnetic head device of claim 5, further comprising a side slider secured to a side of said first head chip opposite that to which the center slider is secured.

7. The magnetic head device of claim 5, wherein said first rail is smaller in width than an overall width of said first head chip by at least 25 micro meters.

* * * * *